US007511846B2

(12) United States Patent
Hart et al.

(10) Patent No.: US 7,511,846 B2
(45) Date of Patent: Mar. 31, 2009

(54) PRINTER HAVING EMBEDDED FUNCTIONALITY FOR PRINTING TIME-BASED MEDIA

(75) Inventors: Peter E. Hart, Menlo Park, CA (US); Jonathan J. Hull, San Carlos, CA (US); Jamey Graham, San Jose, CA (US); Kurt Piersol, Santa Cruz, CA (US)

(73) Assignee: Ricoh Co., Ltd., Tokyo (JP)

( * ) Notice: Subject to any disclaimer, the term of this patent is extended or adjusted under 35 U.S.C. 154(b) by 0 days.

(21) Appl. No.: 10/814,931

(22) Filed: Mar. 30, 2004

(65) Prior Publication Data

US 2005/0069362 A1 Mar. 31, 2005

Related U.S. Application Data

(60) Provisional application No. 60/506,206, filed on Sep. 25, 2003, provisional application No. 60/506,263, filed on Sep. 25, 2003, provisional application No. 60/506,302, filed on Sep. 25, 2003, provisional application No. 60/506,303, filed on Sep. 25, 2003, provisional application No. 60/506,411, filed on Sep. 25, 2003.

(51) Int. Cl.
*G06F 3/12* (2006.01)

(52) U.S. Cl. .................................... 358/1.15; 358/1.16

(58) Field of Classification Search .................. 358/1.6, 358/1.15, 402, 401, 403; 709/201, 217; 710/8, 150; 713/150; 707/104.1; 719/322; 379/88.13; 715/500; 725/153
See application file for complete search history.

(56) References Cited

U.S. PATENT DOCUMENTS 4,133,007 A 1/1979 Wessler et al.
4,205,780 A 6/1980 Burns et al.
4,437,378 A * 3/1984 Ishida et al. .................. 84/609
4,619,522 A 10/1986 Imai
4,635,132 A 1/1987 Nakamura
4,734,898 A 3/1988 Morinaga
4,754,485 A 6/1988 Klatt
4,807,186 A 2/1989 Ohnishi et al.
4,831,610 A * 5/1989 Hoda et al. .............. 369/47.23

(Continued)

FOREIGN PATENT DOCUMENTS

CA 2386829 11/2002

(Continued)

OTHER PUBLICATIONS

Configuring A Printer (NT), Oxford Computer Support [online] [Retrieved on Nov. 13, 2003] Retrieved from the Internet<URL:http://www.nox.ac.uk/cehoxford/ccs/facilities/printers/confignt.htm>.

(Continued)

*Primary Examiner*—James A Thompson
(74) *Attorney, Agent, or Firm*—Fenwick & West LLP

(57) ABSTRACT

A multifunction printer enables the printing of time-based media. Based on received time-based media data, the printer produces a paper or other printed output as well as a related electronic output. Together, the printed and electronic outputs provide a representation of the time-based media. Depending on the desired application for the printer, the printer may include any combination of mechanisms for receiving media data, printing the printed output, and producing the electronic output.

68 Claims, 6 Drawing Sheets

U.S. PATENT DOCUMENTS 4,881,135 A 11/1989 Heilweil
4,907,973 A * 3/1990 Hon ........................... 434/262
4,998,215 A 3/1991 Black et al.
5,091,948 A 2/1992 Kametani
5,093,730 A 3/1992 Ishii et al.
5,115,967 A 5/1992 Wedekind
5,136,563 A 8/1992 Takemasa et al.
5,170,935 A 12/1992 Federspiel et al.
5,220,649 A 6/1993 Forcier
5,231,698 A 7/1993 Forcier
5,270,989 A 12/1993 Kimura
5,343,251 A 8/1994 Nafeh
5,386,510 A 1/1995 Jacobs
5,428,555 A 6/1995 Starkey et al.
5,432,532 A 7/1995 Mochimaru et al.
5,436,792 A 7/1995 Leman et al.
5,438,426 A 8/1995 Miake et al.
5,444,476 A * 8/1995 Conway .................... 348/14.1
5,485,554 A 1/1996 Lowitz et al.
5,493,409 A 2/1996 Maeda et al.
5,568,406 A 10/1996 Gerber
5,576,950 A 11/1996 Tonomura et al.
5,581,366 A 12/1996 Merchant et al.
5,590,257 A 12/1996 Forcier
5,617,138 A 4/1997 Ito et al.
5,633,723 A * 5/1997 Sugiyama et al. ........... 358/296
5,661,783 A * 8/1997 Assis ...................... 379/88.01
5,682,330 A 10/1997 Seaman et al.
5,690,496 A 11/1997 Kennedy
5,717,841 A 2/1998 Farrell et al.
5,721,883 A 2/1998 Katsuo et al.
5,729,665 A 3/1998 Gauthier
5,757,897 A 5/1998 LaBarbera et al.
5,761,380 A 6/1998 Lewis et al.
5,764,368 A 6/1998 Shibaki et al.
5,774,260 A 6/1998 Petitto et al.
5,845,144 A 12/1998 Tateyama et al.
5,877,764 A 3/1999 Feitelson et al.
5,884,056 A 3/1999 Steele
5,903,538 A * 5/1999 Fujita et al. .............. 369/30.76
5,936,542 A 8/1999 Kleinrock et al.
5,940,776 A 8/1999 Baron et al.
5,974,189 A 10/1999 Nicponski
5,987,226 A 11/1999 Ishikawa et al.
6,000,030 A 12/1999 Steinberg et al.
6,020,916 A 2/2000 Gerszberg et al.
6,038,567 A 3/2000 Young
6,043,904 A 3/2000 Nickerson
6,098,106 A 8/2000 Philyaw et al.
6,106,457 A * 8/2000 Perkins et al. .............. 600/175
6,115,718 A 9/2000 Huberman et al.
6,118,888 A 9/2000 Chino et al.
6,123,258 A 9/2000 Iida
6,138,151 A 10/2000 Reber et al.
6,141,001 A 10/2000 Baleh
6,153,667 A * 11/2000 Howald ...................... 523/160
6,167,033 A 12/2000 Chang et al.
6,170,007 B1 1/2001 Venkatraman et al.
6,175,489 B1 * 1/2001 Markow et al. ............. 361/683
6,189,009 B1 2/2001 Stratigos et al.
6,193,658 B1 2/2001 Wendelken et al.
6,296,693 B1 10/2001 McCarthy
6,297,851 B1 10/2001 Taubman et al.
6,298,145 B1 10/2001 Zhang et al.
6,302,527 B1 10/2001 Walker
6,308,887 B1 10/2001 Korman et al.
6,369,811 B1 4/2002 Graham et al.
6,373,498 B1 4/2002 Abgrall
6,373,585 B1 4/2002 Mastie et al.
6,375,298 B2 4/2002 Purcell et al.
6,378,070 B1 4/2002 Chan et al.
6,400,996 B1 6/2002 Hoffberg et al.
6,417,435 B2 7/2002 Chantzis et al.
6,421,738 B1 7/2002 Ratan et al.
6,439,465 B1 8/2002 Bloomberg
6,442,336 B1 8/2002 Lemelson
6,452,615 B1 9/2002 Chiu et al.
6,466,534 B2 10/2002 Cundiff, Sr.
6,476,793 B1 11/2002 Motoyama et al.
6,502,114 B1 12/2002 Forcier
D468,277 S 1/2003 Sugiyama
6,504,620 B1 1/2003 Kinjo
6,515,756 B1 2/2003 Mastie et al.
6,519,360 B1 2/2003 Tanaka
6,529,920 B1 3/2003 Arons et al.
6,535,639 B1 3/2003 Uchihachi et al.
6,544,294 B1 4/2003 Greenfield et al.
6,552,743 B1 4/2003 Rissman
6,556,241 B1 4/2003 Yoshimura et al.
6,593,860 B2 7/2003 Lai et al.
6,594,377 B1 7/2003 Kim et al.
6,611,276 B1 8/2003 Muratori et al.
6,611,622 B1 8/2003 Krumm
6,611,628 B1 8/2003 Sekiguchi et al.
6,647,535 B1 11/2003 Bozdagi et al.
6,654,887 B2 11/2003 Rhoads
6,665,092 B2 * 12/2003 Reed .......................... 358/1.6
6,674,538 B2 * 1/2004 Takahashi .................. 358/1.15
6,678,389 B1 1/2004 Sun et al.
6,687,383 B1 2/2004 Kanevsky et al.
6,700,566 B2 3/2004 Shimoosawa et al.
6,724,494 B1 4/2004 Danknick
6,728,466 B1 4/2004 Tanaka
6,745,234 B1 6/2004 Philyaw et al.
6,750,978 B1 * 6/2004 Marggraff et al. .......... 358/1.12
6,774,951 B2 * 8/2004 Narushima .................. 348/552
6,775,651 B1 8/2004 Lewis et al.
6,807,303 B1 10/2004 Kim et al.
6,824,044 B1 11/2004 Lapstun et al.
6,853,980 B1 2/2005 Ying et al.
6,856,415 B1 2/2005 Simchik et al.
6,877,134 B1 4/2005 Fuller et al.
6,892,193 B2 5/2005 Bolle et al.
6,904,168 B1 6/2005 Steinberg et al.
6,904,451 B1 6/2005 Orfitelli et al.
6,938,202 B1 8/2005 Matsubayashi et al.
6,964,374 B1 11/2005 Djuknic et al.
6,983,482 B2 * 1/2006 Morita et al. ................. 725/32
7,000,193 B1 2/2006 Impink, Jr. et al.
7,023,459 B2 4/2006 Arndt et al.
7,031,965 B1 4/2006 Moriya et al.
7,075,676 B2 7/2006 Owen
7,079,278 B2 7/2006 Sato
7,092,568 B2 8/2006 Eaton
7,131,058 B1 10/2006 Lapstun
7,151,613 B1 12/2006 Ito
7,162,690 B2 1/2007 Gupta et al.
7,174,151 B2 2/2007 Lynch et al.
7,196,808 B2 3/2007 Kofman et al.
7,298,512 B2 11/2007 Reese et al.
7,363,580 B2 4/2008 Tabata et al.
2001/0003846 A1 6/2001 Rowe et al.
2001/0017714 A1 8/2001 Komatsu et al.
2001/0037408 A1 11/2001 Thrift et al.
2001/0052942 A1 12/2001 MacCollum et al.
2002/0001101 A1 1/2002 Hamura et al.
2002/0004807 A1 1/2002 Graham et al.
2002/0006100 A1 1/2002 Cundiff, Sr. et al.
2002/0010641 A1 1/2002 Stevens et al.
2002/0015066 A1 2/2002 Siwinski et al.
2002/0048224 A1 4/2002 Dygert et al.
2002/0051010 A1 5/2002 Jun et al.
2002/0060748 A1 5/2002 Aratani et al.
2002/0066782 A1 6/2002 Swaminathan et al.

| | | | | |
|---|---|---|---|---|
| 2002/0067503 | A1 | 6/2002 | Hiatt | |
| 2002/0078149 | A1 | 6/2002 | Chang et al. | |
| 2002/0087530 | A1 | 7/2002 | Smith et al. | |
| 2002/0095501 | A1 | 7/2002 | Chiloyan et al. | |
| 2002/0099534 | A1 | 7/2002 | Hegarty | |
| 2002/0101343 | A1 | 8/2002 | Patton | |
| 2002/0101513 | A1 | 8/2002 | Halverson | |
| 2002/0131071 | A1 | 9/2002 | Parry | |
| 2002/0131078 | A1 | 9/2002 | Tsukinokizawa | |
| 2002/0135800 | A1 | 9/2002 | Dutta | |
| 2002/0137544 | A1 | 9/2002 | Myojo | |
| 2002/0140993 | A1 | 10/2002 | Silverbrook | |
| 2002/0159637 | A1 | 10/2002 | Echigo et al. | |
| 2002/0169849 | A1 | 11/2002 | Schroath | |
| 2002/0171857 | A1 | 11/2002 | Hisatomi et al. | |
| 2002/0185533 | A1 | 12/2002 | Shieh et al. | |
| 2002/0199149 | A1 | 12/2002 | Nagasaki et al. | |
| 2003/0002068 | A1 | 1/2003 | Constantin et al. | |
| 2003/0007776 | A1 | 1/2003 | Kameyama et al. | |
| 2003/0038971 | A1 | 2/2003 | Renda | |
| 2003/0051214 | A1 | 3/2003 | Graham et al. | |
| 2003/0076521 | A1 | 4/2003 | Li et al. | |
| 2003/0084462 | A1 * | 5/2003 | Kubota et al. | 725/153 |
| 2003/0088582 | A1 | 5/2003 | Pflug | |
| 2003/0093384 | A1 | 5/2003 | Durst et al. | |
| 2003/0110926 | A1 | 6/2003 | Sitrick et al. | |
| 2003/0117652 | A1 | 6/2003 | Lapstun | |
| 2003/0121006 | A1 | 6/2003 | Tabata et al. | |
| 2003/0128877 | A1 | 7/2003 | Nicponski | |
| 2003/0160898 | A1 | 8/2003 | Baek et al. | |
| 2003/0164898 | A1 | 9/2003 | Imai | |
| 2003/0177240 | A1 | 9/2003 | Gulko et al. | |
| 2003/0187642 | A1 | 10/2003 | Ponceleon et al. | |
| 2003/0218597 | A1 | 11/2003 | Hodzic et al. | |
| 2003/0220988 | A1 | 11/2003 | Hymel | |
| 2004/0024643 | A1 | 2/2004 | Pollock et al. | |
| 2004/0036842 | A1 | 2/2004 | Tsai et al. | |
| 2004/0039723 | A1 | 2/2004 | Lee et al. | |
| 2004/0044894 | A1 | 3/2004 | Lofgren et al. | |
| 2004/0125402 | A1 | 7/2004 | Kanai et al. | |
| 2004/0128613 | A1 | 7/2004 | Sinisi | |
| 2004/0143602 | A1 | 7/2004 | Ruiz et al. | |
| 2004/0156616 | A1 | 8/2004 | Strub et al. | |
| 2004/0184064 | A1 | 9/2004 | TaKeda et al. | |
| 2004/0207876 | A1 | 10/2004 | Aschenbrenner et al. | |
| 2004/0215470 | A1 | 10/2004 | Bodin | |
| 2004/0240541 | A1 | 12/2004 | Chadwick et al. | |
| 2004/0249650 | A1 | 12/2004 | Freedman et al. | |
| 2005/0064935 | A1 | 3/2005 | Blanco | |
| 2005/0068569 | A1 | 3/2005 | Hull et al. | |
| 2005/0068581 | A1 | 3/2005 | Hull et al. | |
| 2005/0125717 | A1 | 6/2005 | Segal et al. | |
| 2006/0250585 | A1 | 11/2006 | Anderson et al. | |
| 2007/0033419 | A1 | 2/2007 | Kocher et al. | |
| 2007/0065094 | A1 | 3/2007 | Chien et al. | |
| 2007/0109397 | A1 | 5/2007 | Yuan et al. | |
| 2007/0162858 | A1 | 7/2007 | Hurley et al. | |
| 2007/0168426 | A1 | 7/2007 | Ludwig et al. | |
| 2007/0268164 | A1 | 11/2007 | Lai et al. | |
| 2008/0037043 | A1 | 2/2008 | Hull et al. | |

FOREIGN PATENT DOCUMENTS

| | | | |
|---|---|---|---|
| CN | 1352765 | A | 6/2002 |
| CN | 1097394 | C | 12/2002 |
| EP | 1133170 | A2 | 9/2001 |
| WO | WO 99/18523 | | 4/1999 |
| WO | WO 02/082316 | A1 | 10/2002 |

OTHER PUBLICATIONS

"DocumentMall Secure Document Management" [online] Retrieved on Mar. 9, 2004). Retrieved from the Internet <URL: http://www.documentmall.com>.

Girgensohn, Andreas et al., "Time-Constrained Keyframe Selection Technique," Multimedia Tools and Applications (2000), vol. 11, pp. 347-358.

Graham, Jamey et al., "A Paper-Based Interface for Video Browsing and Retrieval," IEEE International Conference on Multimedia and Expo (Jul. 6-9, 2003), vol. 2, P:II 749-752.

Graham, Jamey et al., "The Video Paper Multimedia Playback System," Proceedings of the 11th ACM International Conference on Multimedia (Nov. 2003), pp. 94-95.

Graham, Jamey et al., "Video Paper: A Paper-Based Interface for Skimming and Watching Video," International Conference on Consumer Electronics (Jun. 16-18, 2002), pp. 214-215.

Hull, Jonathan J. et al., "Visualizing Multimedia Content on Paper Documents: Components of Key Frame Selection for Video Paper," Proceedings of the 7th International Conference on Document Analysis and Recognition (2003), vol. 1, pp. 389-392.

"Kofax: Ascent Capture: Overview" [online] [Retrieved on Jan. 22, 2004]. Retrieved from the Internet: <URL http://www.kofax.com/products/ascent/capture>.

PostScript Language Document Structing Conventions Specification, Version 3.0 (Sep. 25, 1992), Adobe Systems Incorporated.

Gopal, S. et al., "Load Balancing in a Heterogeneous Computing Environment," Proceedings of the Thirty-First Hawaii International Conference on System Sciences, Jan. 6-9, 1998.

Gropp, W. et al., "Using MPI—Portable Programming with the Message-Passing Interface," copyright 1999, pp. 35-42, second edition, MIT Press.

"Seiko Instruments USA, Inc.—Business and Home Office Products" online, date unknown, Seiko Instruments USA, INc., [retrieved on Jan. 25, 2005]. Retrieved from the Internet: <URL: http://www.siibusinessproducts.com/products/link-ir-pp-html>.

"Tasty FotoArt" [online], date unknown, Tague Technologies, Inc., Retrieved from the Internet: <URL: http//www.tastyfotoart.com>.

Poon, K.M. et al., "Performance Analysis of Median Filtering on Meiko™ —A Distributed Multiprocessor System," IEEE First International Conference on Algorithms and Architectures for Parallel Processing, 1995, pp. 631-639.

Gropp, W. et al., "Using MPI-Portable Programming with the Message Passing Interface," copyright 1999, pp. 35-42, second edition, MIT Press.

ASCII 24.com, [online] (date unknown), Retrieved from the Internet<URL:http://216.239.37.104/search?q=cache:z-G9M1EpvSUJ:ascii24.com/news/i/hard/article/1998/10/01/612952-000.html+%E3%82%B9%E3%...>.

Label Producer by Maxell, [online] [Retrieved on Nov. 11, 2003]. Retrieved from the Internet<URL:http://www.maxell.co.jp/products/consumer/rabel_card/>.

Movie-PhotoPrint by Canon, [online] [Retrieved on Nov. 11, 2003]. Retrieved from the Internet<URL:http://cweb.canon.jp/hps/guide/rimless.html>.

Print From Cellular Phone by Canon, [online] [Retrieved on Nov. 11, 2003]. Retrieved from the Internet<URL: http://cweb.canon.jp/bj/enjoy/pbeam/index.html>.

Print Images Plus Barcode by Fuji Xerox, [online][Retrieved on Nov. 11, 2003]. Retrieved from the Internet<URL: http://www.fujixerox.co.jp/soft/cardgear/release.html>.

Print Scan-Talk By Barcode by Epson, [online] [Retrieved on Nov. 11, 2003]. Retrieved from the Internet<URL: http:www.epson.co.jp/osirase/2000/000217.htm>.

Printer With CD/DVD Tray, Print CD/DVD Label by Epson, [online] [Retrieved on Nov. 11, 2003]. Retrieved from the Internet<URL: http://www.i-love-epson.co.jp/products/printer/inkjet/pmd750/pmd7503.htm>.

R200 ScanTalk [online] (date unknown). Retrieved from the Internet<URL:http://homepage2.nifty.com/vasolza/ScanTalk.htm>.

Variety of Media In, Print Paper Out by Epson, [online] [Retrieved on Nov. 11, 2003]. Retrieved from the Internet<URL: http://www.i-love-epson.co.jp/products/spc/pma850/pma8503.htm>.

Lamming, M. et al., "Using Automatically Generated Descriptions of Human Activity to Index Multi-media Data," IEEE Multimedia Communications and Applications IEE Colloquium, Feb. 7, 1991, pp. 5/1-5/3.

Communication Pursuant to Article 96(2) EPC, European Application No. 04255836.1, Jun. 11, 2007, 10 pages.
Stifelman, L. et al., "The Audio Notebook," SIGHI 2001, Mar. 31-Apr. 5, 2001, pp. 182-189, vol. 3, No. 1, Seattle, WA.
Chinese Application No. 2004100849823 Office Action, Jun. 1, 2007, 24 pages.
Chinese Application No. 2004100897988 Office Action, Apr. 6, 2007, 8 pages.
Arai, T. et al., "PaperLink: A Technique for Hyperlinking from Real Paper to Electronic Content," CHI 97, Mar. 22-27, 1997, pp. 327-334.
Brown et al., "A Diary Study Of Information Capture In Working Life," Proceedings Of ACM CHI 2000 Conference On Human Factors In Computing Systems, 2000, pp. 438-445, vol. 1.
Dorai, T. et al., "End-To-end Videotext Recognition for Multimedia Content Analysis," 2001 IEEE International Conference on Multimedia and Expo, IEEE, Aug. 2001, pp. 601-604.
Erol, Berna et al., "Linking Multimedia Presentations With Their Symbolic Source Documents: Algorithm And Applications," ACM Multimedia '03, Nov. 2-8, 2003, pp. 498-507, Berkeley, CA.
Erol, Berna et al., "Prescient Paper: Multimedia Document Creation With Document Image Matching," 17th International Conference On Pattern Recognition, Aug. 2004, 4 pages, Cambridge, U.K.
Erol, Berna et al, "Retrieval Of Presentation Recordings With Digital Camera Images," IEE Conference On Computer Vision And Pattern Recognition (CVPR), Jun. 27-Jul. 2, 2004, 2 pages, Washington, D.C.
Hecht, D.L., "Printed Embedded Data Graphical User Interfaces," Computer, Mar. 2001, pp. 47-55, vol. 34, Issue 3.
Karasik, D., "Image Processing in Perl Graphic Applications," Google, Apr. 2, 2003, pp. 1-12.
Klemmer, S.R. et al., "Books with Voices: Paper Transcripts as a Tangible Interface to Oral Histories," CHI 2003, Apr. 5-10, 2003, pp. 89-96, vol. 5, Issue No. 1.
Lienhart, Rainer et al., "Localizing And Segmenting Text In Images And Videos," IEEE Transactions On Circuits And Systems For Video Technology, Apr. 2002, pp. 256-268, vol. 12, No. 4.
Otsu, N., "A Threshold Selection method From Gray-Level Histograms," IEEE Transactons on Systems, Man and Cybernetics, Jan. 1979, pp. 62-66, vol. SMC-9, No. 1.
Srihari, S.N. et al., "Name And Address Block Reader System For Tax Form Processing," IEEE, 1995, pp. 5-10.
U.S. Appl. No. 10/814,932, filed Mar. 30, 2004.
U.S. Appl. No. 10/814,751, filed Mar. 30, 2004.
U.S. Appl. No. 10/813,847, filed Mar. 30, 2004.
U.S. Appl. No. 10/814,931, filed Mar. 30, 2004.
U.S. Appl. No. 10/814,948, filed Mar. 30, 2004.
U.S. Appl. No. 10/814,386, filed Mar. 30, 2004.
U.S. Appl. No. 10/814,700, filed Mar. 30, 2004.
U.S. Appl. No. 10/814,500, filed Mar. 30, 2004.
U.S. Appl. No. 10/814,845, filed Mar. 30, 2004.
U.S. Appl. No. 09/714,785, filed Nov. 15, 2000.
Hardman, L. et al, "Integrating the Amsterdam Hypermedia Model with the Standard Reference Model for Intelligent Multimedia Presentation Systems," Computer Standards & Interfaces, 1997, pp. 497-507, vol. 18.
Lausen, S., "User Interface Design: A Software Engineering Perspective," 2005, 28 pages.
Dimitrova, N. et al., "Applications of Video-Content Analysis and Retrieval," IEEE Multimedia, Jul.-Sep. 2002, pp. 42-55.
European Search Report, EP 04255836, Sep. 12, 2006, 4 pages.
European Search Report, EP 04255837, Sep. 5, 2006, 3 pages.
European Search Report, EP 04255839, Sep. 4, 2006, 3 pages.
European Search Report, EP 04255840, Sep. 12, 2006, 3 pages.
Graham, J. et al., "A Paper-Based Interface for Video Browsing and Retrieval," ICME '03, Jul. 6-9, 2003, pp. 749-752, vol. 2.
Graham, J. et al., "Video Paper: A Paper-Based Interface for Skimming and Watching Video," ICCE '02, Jun. 18-20, 2002, pp. 214-215.
Klemmer, S.R. et al., "Blocks With Voices: Paper Transcripts as a Tangible Interface to Oral Histories," CHI Letters, Apr. 5-10, 2003, pp. 89-96, vol. 5, Issue 1.
Minami, K. et al., "Video Handling with Music and Speech Detection," IEEE Multimedia, Jul.-Sep. 1998, pp. 17-25.
Shahraray, B. et al, "Automated Authoring of Hypermeida Documents of Video Programs," ACM Multimedia '95 Electronic Proceedings, San Francisco, CA, Nov. 5-9, 1995, pp. 1-12.
Shahraray, B. et al., "Pictorial Transcripts: Multimedia Processing Applied to Digital Library Creation," IEEE, 1997, pp. 581-586.
U.S. Appl. No. 10/660,867, filed Sep. 12, 2003, Erol et al.
"Microsoft Powerpoint—Wikipedia, the free encyclopedia," Wikimedia Foundation, Inc., [online] [Retrieved on Nov. 7, 2006] Retrieved from the internet <URL:http://en.wikipedia.org/wiki/Microsoft_PowerPoint>.

* cited by examiner

PRINTER HAVING EMBEDDED FUNCTIONALITY FOR PRINTING TIME-BASED MEDIA

CROSS REFERENCE TO RELATED APPLICATIONS

This application claims the benefit of the following provisional patent applications, each of which is incorporated by reference in its entirety: U.S. Provisional Application No. 60/506,206, filed Sep. 25, 2003; U.S. Provisional Application No. 60/506,263, filed Sep. 25, 2003; U.S. Provisional Application No. 60/506,302, filed Sep. 25, 2003; U.S. Provisional Application No. 60/506,303, filed Sep. 25, 2003; and U.S. Provisional Application No. 60/506,411, filed Sep. 25, 2003.

This application is also related to the following co-pending patent applications, each of which is incorporated by reference: U.S. application Ser. No. 10/814,948, entitled, "Networked Printing System Having Embedded Functionality for Printing Time-Based Media," filed Mar. 30, 2004; U.S. application Ser. No. 10/814,386, entitled, "Stand Alone Multimedia Printer Capable of Sharing Media Processing Tasks," filed Mar. 30, 2004; U.S. application Ser. No. 10/814,700, entitled, "Printer User Interface," to Hart et al., filed Mar. 30, 2004; U.S. application Ser. No. 10/814,842, entitled, "Printer with Multimedia Server," filed Mar. 30, 2004; U.S. application Ser. No. 10/814,841, entitled, "Multimedia Output Device Having Embedded Encryption Functionality," filed Mar. 30, 2004; U.S. application Ser. No. 10/813,946, entitled, "Printer With Audio/Video Localization," filed Mar. 30, 2004; U.S. application Ser. No. 10/813,849, entitled, "Music Processing Printer,"filed Mar. 30, 2004; U.S. application Ser. No. 10/813,846, entitled, "Printer With Audio or Video Receiver, Recorder, and Real-Time Content-Based Processing Logic," filed Mar. 30, 2004; and U.S. application Ser. No. 10/813,950, entitled, "Printing System With Embedded Audio/Video Content Recognition and Processing," filed Mar. 30, 2004.

BACKGROUND

1. Field of the Invention

This invention relates generally to printers that have embedded functionality for printing time-based media, and in particular to printing time-based media that results in a combination of a printed output and a related electronic data output.

2. Background of the Invention

A conventional printer can receive documents or other data in a number of formats and then prints the contents of those documents or data in accordance with the proper format. But while conventional printers can print documents in a wide variety of formats, these printers are fundamentally limited in their ability to reproduce different kinds of media. For example, it is standard technology for a printer to produce images of static text, pictures, or a combination of the two. But because these printers print onto paper or another similar fixed medium, they cannot record the nuances of time-based media very well.

What is needed therefore is a printer that is equipped to print time-based media without the limitations of conventional printers. It is further desirable that such a print be able to perform at least some of the necessary processing itself rather than require an attached computer or other device to perform all of the processing.

SUMMARY OF THE INVENTION

To satisfy the needs unmet by conventional printers, a multifunction printer enables the printing of time-based media. In a typical hardware configuration for such a multifunction printer, a printer includes a print engine that produces a paper or other printed output and one or more electronic devices the produce a related electronic output. Together, the printed and electronic outputs provide an improved representation of the time-based media over that of a convention paper printer.

In one embodiment, a printer includes an interface for receiving time-based media and a media processing system coupled to the interface to receive the time-based media. Based on any of a number of desired applications, the media processing system determines a printed representation of the time-based media and an electronic representation of the time-based media. A printed output system in communication with the media processing system receives the printed representation and produces a corresponding printed output. Similarly, an electronic output system in communication with the media processing system receives the electronic representation and produces a corresponding electronic output. In this way, the printer creates a representation of time-based media by producing a printed output and an electronic output.

In various embodiments, the printer includes different combinations of embedded devices that allow for various mechanisms for receiving the media and various mechanisms for creating the electronic and printed outputs. For example, the interface may include a single communication interface, a network interface, a removable media storage device reader, a video input device (such as a DVD reader or a video cassette reader), an audio input device (such as a CD reader or an audio cassette reader), a media broadcast receiver, a radio receiver, screen capture hardware, a video and/or audio recorder, or any of a number of different types of devices that can receive time-based media. Similarly, the electronic output system may write the electronic representation to one or more different types of removable media storage devices, such as a DVD, a video cassette tape, a CD, an audio cassette tape, a flash card, a computer disk, an SD disk, or another computer-readable medium. The electronic output system may also include a disposable media writer, a self-destructing media writer, a video display, an audio speaker, a driver for a speaker system (such as an embedded MIDI player), or an embedded web page display. In this way, a multifunction printer can be configured to have any of a large number of combinations of embedded subsystems, allowing various embodiments of the printer to meet the needs of many different applications.

Because of the great many combinations of input and output devices possible for the multifunction printer, the printer may include embedded hardware, software, or a combination thereof for performing a wide variety of different operations on the media. In this way, the printer can be configured to produce various types of printed and electronic outputs based on received media to meet the needs of different applications. To solve various problems, in embodiments of the printer, the media processing system includes one or more of an embedded multimedia server, an embedded audio encryption module, an embedded video encryption module, an embedded audio sound localization module, and an embedded video motion detection module.

These different tasks may be performed on the printer by the media processing system, or partially on the printer by the media processing system in conjunction with one or more electronic devices capable of performing some of the required processing steps. The printer can thus balance the required processing of the media between the printer and one or more connected electronic devices, such as a personal computer or an external network service. By conducting at least some of the processing on the printer, the printer relieves at least some of the processing load on external devices that the printer's additional functionality may require.

DETAILED DESCRIPTION OF THE PREFERRED EMBODIMENTS

Various embodiments of a multifunction printer enable the printing of time-based media in a useful and intelligent format. To create a representation of this time-based media, the printer produces a printed output and a related electronic output, which together provide a representation of the received media. Depending on the desired application for the printer, the printer may include any number of devices for receiving the media, printing the printed output, and producing the electronic output. Therefore, a number of embodiments of the printer are described herein to show how such a printer can be configured in a virtually limitless number of combinations to solve or address a great number of needs that exist.

Printer Architecture

Figure 1:
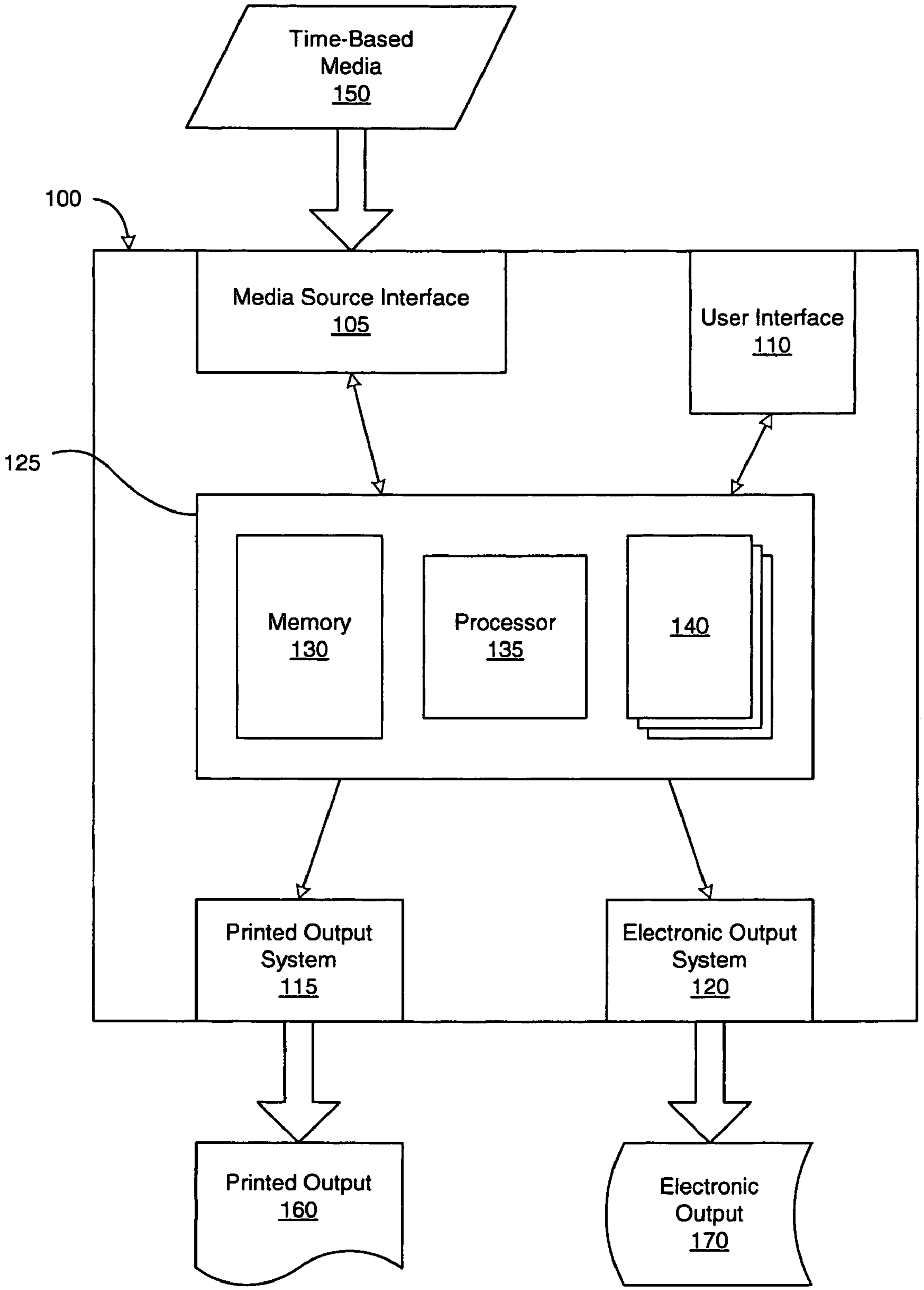
FIG. 1 is a schematic diagram of a printer in accordance with an embodiment of the invention.

FIG. 1 is a high-level diagram of one embodiment of the printer 100. Printer 100 includes a media source interface 105, a user interface 110, a printed output system 115, an electronic output system 120, and a media processing system 125. Capable of receiving time-based media 150, the media source interface 105 can take a variety of forms and may include one or more devices that can receive media data or create media data by observing a media event. Similarly, the printed output system 115 and the electronic output system 120 can take a variety of forms and may each include one or more devices that can produce, respectively, a printed output 160 and an electronic output 170. The user interface 110 may include a display system, software for communicating with an attached display, or any number of embodiments described in co-pending U.S. patent application entitled, "Printer User Interface," to Hart et al., filed Mar. 30, 2004, which application is incorporated by reference in its entirety In one embodiment, the media processing system 125 includes a memory 130, a processor 135, and one or more embedded functionality modules 140. The embedded functionality modules 140, which are described in more detail below, may include software, hardware, or a combination thereof for implementing at least a portion of the functionality of the multifunction printer 100. The media processing system 125 is coupled to the media source interface 105 and the user interface 110, allowing it to communicate with each of those devices. The media processing system 125 is also coupled to the printed output system 115 and to the electronic output system 120 for providing the appropriate commands and data to those systems.

Figure 2:
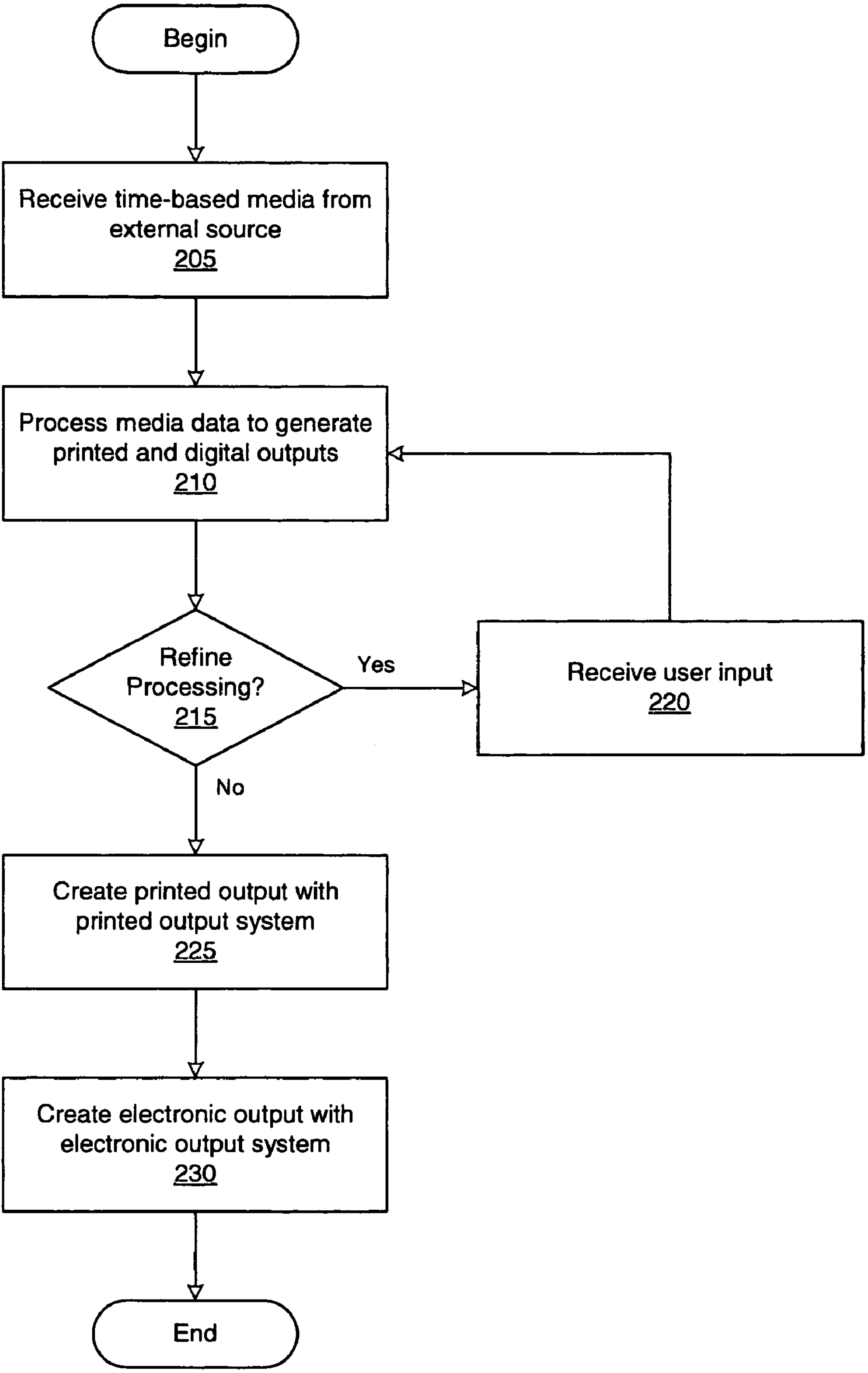
FIG. 2 is a flow diagram of the operation of the printer in accordance with an embodiment of the invention.

FIG. 2 shows an overview of a generalized process in which the printer 100 creates a representation of time-based media data 150, in accordance with one embodiment of the invention. The printer 100 first receives 205 time-based media 150 from an external source with the media source interface 105. This media 150 may be received as digital or analog data, or it may be an observable event that the interface 105 records as digital or analog data. Coupled to the interface 105 to receive the media 150, the media processing system 125 processes 210 the media data to generate printed and electronic outputs. This processing 210 is performed in accordance with the intended functionality of the printer 100, and examples of different operations are described in greater detail below.

In one embodiment, the printer 100 includes a user interface 110 to allow a user to preview the generated outputs. If 215 the user desires to refine the processing, the user can enter commands, which the printer 100 receives 220 by way of the user interface 110. Based on the user's commands, the printer 100 then repeats the processing 210 of the media data to generate new printed and electronic outputs. This refinement process can be iterated until the user is satisfied with the printed and electronic outputs. When this occurs, the user will indicate that the printing should commence, for example, by invoking a print command with the user interface 110. The media processing system 125 then sends the generated printed output to the printed output system 115 and the electronic output to the electronic output system 120. The printed output system 115 then creates 225 a printed output 160, and the electronic output system 120 creates 230 an electronic output 170.

It can be appreciated that this generalized description of a multifunction printer lends itself to a great number of specific configurations and applications. Accordingly, examples of the possible configurations, applications, and particular components are further described.

Media Source Interface

Figure 3:
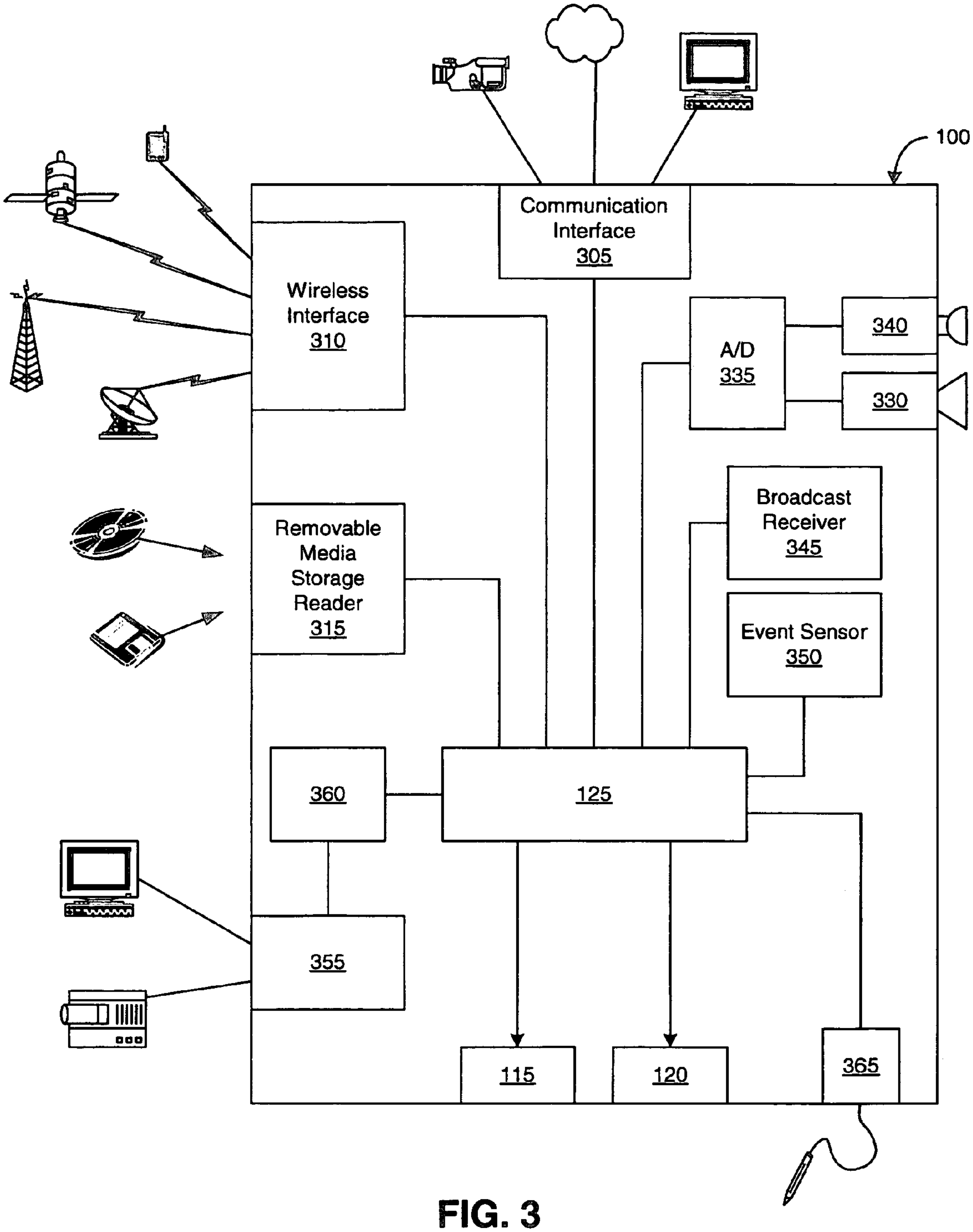
FIG. 3 is a schematic diagram of various media source input subsystems of the printer, in accordance with embodiments of the invention.
Figure 4:
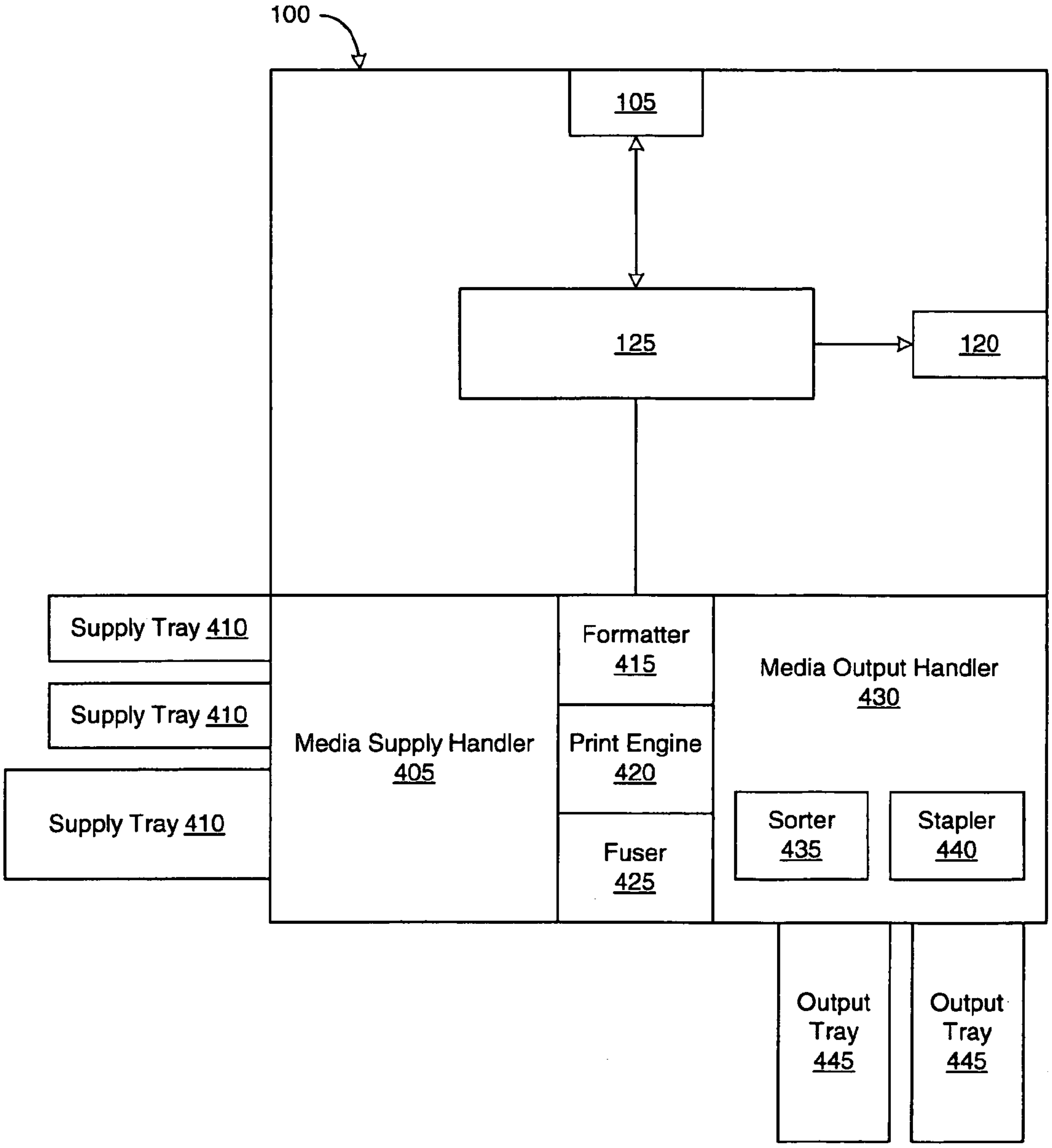
FIG. 4 is a schematic diagram of the printer's printed output system, in accordance with an embodiment of the invention.

The media source interface 105 can be designed to accommodate any suitable type of time-based media. Because of the great variety of types and formats of media data, the media source interface 105 may take any number of forms to accept any time-based media that a user might wish to print. FIG. 3 illustrates some examples of different interfaces 105 by which the printer 100 can receive media data from an external source. In particular implementations, the printer 100 may have only one or only a subset of these types of interfaces 105, and in addition may have other types of interfaces not shown.

As shown in FIG. 3, the printer 100 may include a single communication interface 305 that allows the printer 100 to be communicatively coupled to another electronic device. Depending on the desired input, the interface 305 may allow the computer to communicate with a wide variety of different electronic devices that can provide the printer 100 with time-based media to print. Without intending to limit the types of devices, the interface 305 may allow the printer 100 to received media data from external sources such as computer systems, computer networks, digital cameras, video cameras, media renderers (such as DVD and CD players), media receivers (such as televisions, satellite receivers, set-top boxes, radios, and the like), external storage devices, video game systems, or any combination thereof. The connection type for the interface 305 can take a variety of forms based on the type of device that is intended to be connected to the printer 100 and the available standard connections for that type of device. For example, the interface 305 may comprise a port for connecting the device using a connection type such as USB, serial, FireWire, SCSI, IDE, RJ11, optical, composite video, component video, or S-video, or any other suitable connection type.

In another embodiment, the printer 100 includes a wireless interface 310. As illustrated, the wireless interface 310 allows the printer 100 to receive media data from a wireless device external to the printer 100. The wireless interface 310 may allow the printer 100 to communicate with any number of wireless communication systems, such as wireless components on a home or business network, cellular phones and other portable wireless devices, satellites, satellite dishes, and devices using radio transmissions. Depending on the types of external devices with which the printer 100 is desired to communicate, the wireless interface 310 may comprise hardware and/or software that implements a wireless communications protocol, such as that described in IEEE 802.11 or the Bluetooth standard.

In another embodiment, the printer 100 receives media data from a removable media storage reader 315 that is built into the printer 100. The removable media storage reader 315 may be configured to accommodate any type of removable media storage device, such as DVDs, CDs, video cassette tapes, audio cassette tapes, floppy disks, ZIP disks, flash cards, micro-drives, memory sticks, SD disks, or any other suitable type of media storage devices. Moreover, the printer 100 may have a plurality of removable media storage readers 315 to accommodate multiple types of media storage devices.

In another embodiment, the printer 100 includes an embedded video recorder 330. In this embodiment, the external source of media data is a series of images captured by the embedded video recorder 330. The video recorder 330, such as a camera, CCD, or other suitable mechanism for capturing a sequence of images, converts a scene into a suitable electrical format, such as that described in the MPEG, H.263, or H.264 standards. Optionally, an analog-to-digital converter 335 converts an image directly from the video recorder 330 into a digital format, which is then provided to the media processing system 125. In yet another embodiment, the media processing system 125 receives raw video data from the video recorder 330 and performs any necessary conversion, encoding, and compression on the video data.

In another embodiment, the printer 100 includes an embedded audio recorder 340. In this embodiment, the external source of media data is a series of sounds that are converted into an electrical format by the embedded audio recorder 340. The audio recorder 340 converts the recorded sound signal into a suitable electrical format, such as that described in MPEG-2. Optionally, an analog-to-digital converter 335 converts the sound directly from the audio recorder 340 into a digital format, which is then provided to the media processing system 125. In yet another embodiment, the media processing system 125 receives raw audio data from the audio recorder 340 and performs any necessary conversion, encoding, and compression on the audio data.

In another embodiment, the printer 100 comprises a media broadcast receiver 345. The media broadcast receiver 345 can be tuned to a media broadcast from a media broadcaster. Types of media broadcasts that can be tuned into and received include broadcasts from the Internet, cable, television, radio, and any other broadcasted media source. To tune into a particular media broadcast, a user may select the broadcast using the user interface 110. In one embodiment, the broadcast receiver 345 is an embedded TV receiver, an embedded radio receiver, an embedded short-wave radio receiver, an embedded satellite radio receiver, an embedded two-way radio, an embedded cellular phone, or a combination of any of the above. However, these are not meant to be limiting, as the broadcast receiver 345 can be any device that is capable of tuning into a signal and receiving media data therefrom.

In another embodiment, the printer 100 includes an embedded event sensor 350 that receives a signal about or otherwise observes a real-world event. Similar to a broadcast receiver 345, the event sensor 350 may receive data about a real-world event, for example, by an embedded National Weather Service radio alert receiver or an embedded TV Emergency Broadcast System (EBS) alert monitor. Alternatively, the event sensor 350 may comprise an embedded heat sensor, an embedded humidity sensor, or another type of measuring device so that the event sensor 350 can directly measure the environment and generate time-based media therefrom. In this way, the printer 100 can be used to record events near the printer or far from it and generate meaningful time-based informational outputs based on those events.

In another embodiment, the printer may include video capture hardware 355. In one embodiment, the video capture hardware 355 is designed to be coupled to a computing system by a video cable thereof. The video cable from a display is attached to the printer 100, where the video signal is split with one signal directed to the computing system and another signal to the video capture hardware 355. The video capture hardware 355 performs a differencing between successive frames of the video signal and saves frames with a difference that exceeds a threshold on a secondary storage in the printer 100. This offloads such processing from the computing system, thereby improving responsiveness and user experience and providing an easily browseable record of a user's activities during the day. To take advantage of the printing capabilities of the multifunction printer, the user can chose to print selected frames captured by the video capture hardware 355. The printing can be generated on demand with the user interface 110 on the printer or from the attached computing system, or automatically with scheduling software. In this way, a user can view a replay of any actions taken on the computing system. Notably, the captured content can be effectively compressed because the differences between frames are small.

In another embodiment, the video capture hardware 355 is coupled to a converter module 360, such as VGA-to-NTSC conversion hardware. Such an embodiment could be used in conjunction with a projector to capture presentations made with the projector. Audio capture could also be employed to record a speaker's oral presentation. To use the video capture hardware 355 in this way, a user could connect a laptop or other computing system and the projector to the printer 100. The printer 100 then captures video frames, compares them to the most recently captured frame, and retains those frames that are different. A parallel audio track may also be saved. This capability could also be used in a desktop printer to record a presentation made on a computing system connected to the printer. The printer can then serve the audio or it can be written to a digital medium, such as an SD disk that can be played from a cell phone or a PDA. The audio could also be written to a bar code on a printed representation.

In another embodiment, the printer 100 comprises an ultrasonic pen capture device 365. In this embodiment, the printer 100 includes a hardware module 365 that serves as a low-cost sensor that can be coupled to a paper document. With such a device, a user can write on a paper document, and the results are saved on the printer 100. In one form, the captured results include the user's writing in combination with time data that indicates when the writing occurred. This time-based media data can then be printed or sent (e.g., by electronic mail) to someone else, for example showing a user's notes as well as time stamps that indicate when the notes were taken.

Printed Output System

The printed output system 115 may comprise any standard printing hardware, including that found in standard laser printers, inkjet printers, thermal wax transfer printers, dye sublimation printers, dot matrix printers, plotters, or any other type of printing mechanisms suitable for creating a printer image on an appropriate physical medium. In the example described herein, a laser printer mechanism is described; however, it should be understood that any suitable printing system can be used. The printer 100 includes any necessary subsystems, as known by one skilled in the art, to print on a printable medium, such as a sheet of paper.

In one embodiment, the printed output system 115 comprises a media supply handler 405 that receives blank paper to be printed on. The media supply handler 405 typically obtains the paper from a supply tray 410. The printer 100 may include multiple supply trays 410, allowing the printer to accommodate different sizes and types of paper as well as trays 410 of varying capacity. When the printer 100 needs blank paper for printing, the media supply handler 405 provides the print engine 420 with a sheet of blank medium.

The formatter 415 converts data received from the media processing system 125 into a format that the print engine 420 can use to create an image on the paper. The print engine 420 creates an image on the paper as indicated by the formatter 415. A fuser 425 then uses high temperature and pressure to fuse the image onto the paper to fix the image thereon. Once the image is fixed, the paper is fed to the media output handler 430. Although not shown, it is appreciated that the printer 100 includes any necessary motors, gears, and diverters to cause the paper to move through the printer 100.

The media output handler 430 receives one or more printed sheets of paper and performs any requested finishing to the sheets. For example, the media output handler 430 may include a sorter 435 to sort or collate the sheets for multiple copies and a stapler 440 to attach the sheets together. When the finishing process is complete, the media output handler 430 moves the sheets to an output tray 445, of which there may be multiple trays 445 to accommodate different sizes, types, and capacities of printed output.

Electronic Output System

Figure 5:
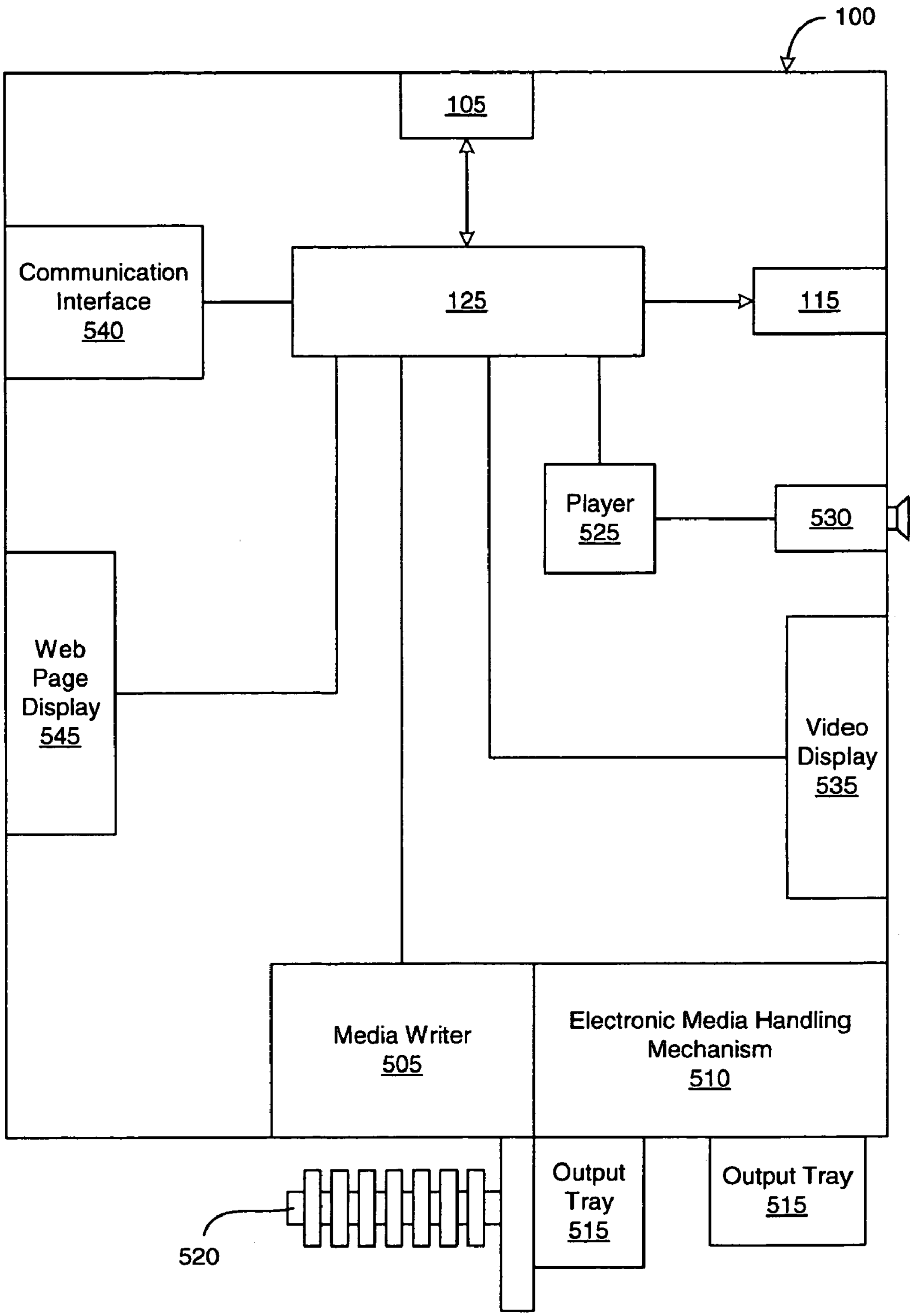
FIG. 5 is a schematic diagram of various electronic media output systems of the printer, in accordance with embodiments of the invention.
Figure 6:
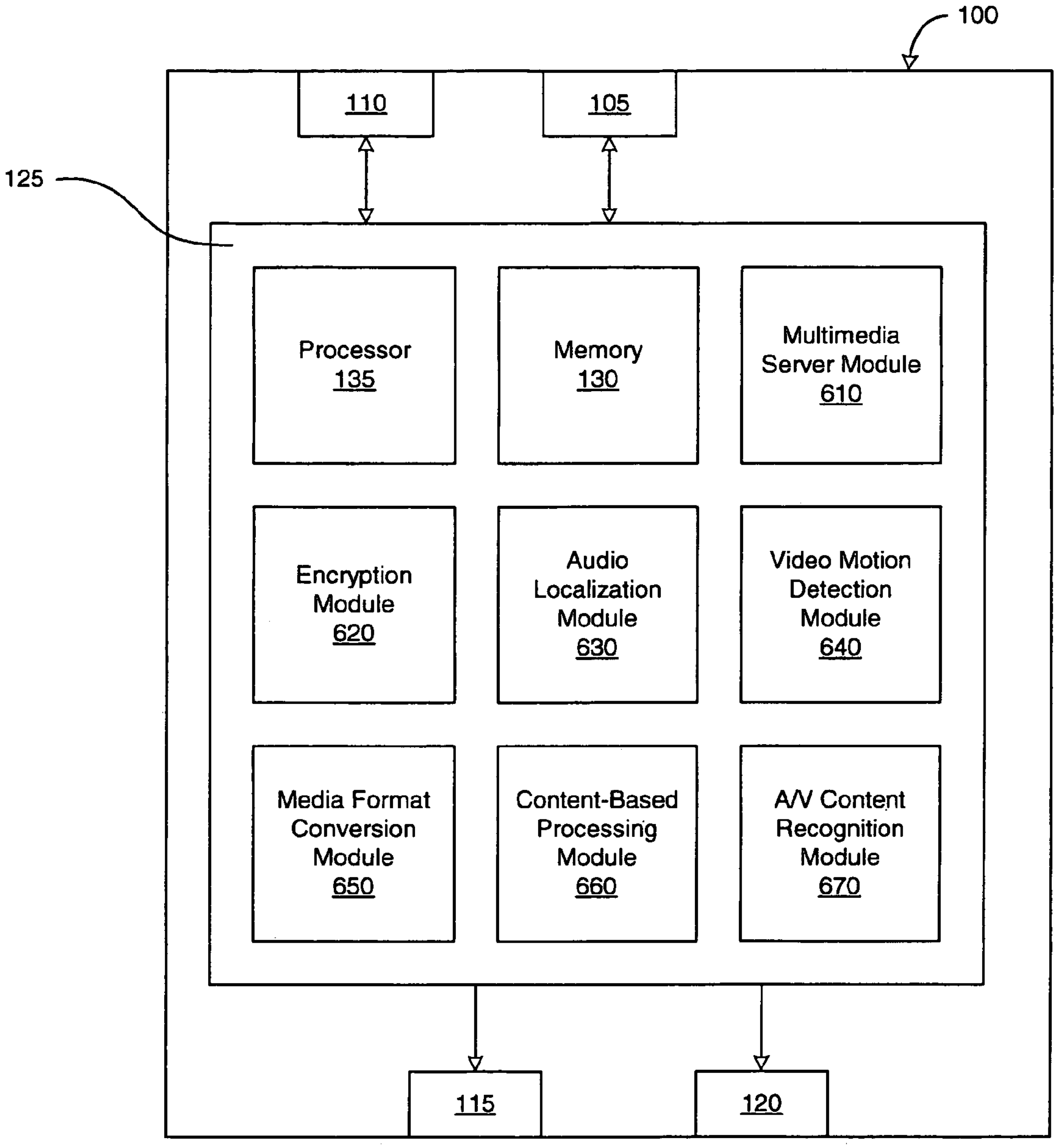
FIG. 6 is a schematic diagram of various media processing systems of the printer, in accordance with embodiments of the invention.

The electronic output system 120 can be designed to produce an electronic output related to the media data in any desired format. Because of the great variety of types and formats of electronic outputs, the electronic output system 120 may take any of a number of forms for producing an electronic output desired by the user. FIG. 5 illustrates some examples of different embodiments of the electronic output system 105. In particular implementations, the printer 100 may have only one or only a subset of the various components shown, and in addition it may have other types of not shown.

In one embodiment, the printer 100 writes the electronic output to a removable media device with a media writer 505. Many different types of media writers are know in the art, and the media writer 505 many comprise any of these. For example, the media writer 505 may be configured to write the electronic output to removable storage devices such as a writeable DVD or CD, a video cassette tape, an audio cassette tape, a flash card, a computer disk, an SD disk, a memory stick, or any other appropriate electronically readable medium. Moreover, the electronic output system 120 may include a number of media writers 505 of different types to allow the printer 100 to print onto different electronic formats. In addition, the electronic output system 120 may include a number of media writers 505 of the same type to increase the output capacity of the printer 100.

The removable storage device that receives the electronic output from the printer 100 may be fed to the media writer directly by a user, for example by inserting a blank disk into a drive. In another embodiment, the printer 100 includes an electronic media handling mechanism 510 coupled to the media writer 505 that automatically provides the media writer 505 with an appropriate type of removable storage device. The handling mechanism 510 may further be configured to physically place written-to storage devices into an output tray 515. In one embodiment, a series of blank storage devices are fed to the printer 100 by a bandolier 520 or other type of feeder, allowing the printer 100 to create a high volume of electronic output without requiring a significant amount of interaction with a human operator. The bandolier 520 preferably then places the written to devices into an output tray 515.

In another embodiment, the media writer 505 is a disposable media writer, configured to write electronic data to a disposable removable media storage mechanism. In another embodiment, the media writer 505 writes the electronic data to a self-destructing medium. In this way, a user can view the electronic data for a predetermined number of times or during a predetermined period of time, after which the electronic data are no longer viewable.

In another embodiment, the electronic output system 120 includes a speaker system 530. The speaker system 530 is designed to receive an audio signal from the media processing system 125, in response to which the audio is played from an embedded speaker 530 in the printer 100. The electronic output system 120 may further include a player 525 or audio renderer that receives an encoded audio signal from the media processing system 125 and converts it into an audio signal for the speaker 530. The player 525 thus takes some of the processing load off the media processing system 125. For example, the player 525 may include a MIDI player for generating the audio signal; however, many other audio renderers may be used, in either hardware or software.

In another embodiment, the electronic output system 120 includes a video display 535. The video display 535 is designed to receive a video signal from the media processing system 125, in response to which the video is played on the video display 535 embedded into the printer 100. Similarly, the video display 535 may receive the video signal directly from a driver to reduce the processing load on the media processing system 125.

In another embodiment, the printer 100 transmits the electronic output that is to be printed to another device as a signal. This signal can later be fixed in a tangible medium by the external device. To facilitate this, the electronic output system 120 includes a communication interface 540. The communication interface receives the electronic output from the media processing system 125 and sends the electronic output to the external device, which may be in communication with the printer 100 over a local network, the Internet, a wireless network, Universal Serial Bus (USB), IEEE 1394, a direct connection, or any other suitable communication means.

In another embodiment, the electronic output system 120 comprises an embedded web page display 545. The web page display 545 allows a user to see a representation of the electronic output in a web-based form.

Media Processing System

The media processing system 125 of the printer 100 is designed to perform the specialized functionality of the multifunction printer 100. To send and receive messages between external devices or the user interface 110, the processing system 125 includes a processor 135 and a memory 130. In addition, the media processing system includes one or more hardware and/or software modules that enable the printer 100 to create related printed and electronic outputs for different types of time-based media. In this way, the printer 100 can be configured to have any number of embedded functionalities.

In one embodiment, the printer includes one or a combination of an embedded multimedia server module 610, an encryption module 620, an audio localization module 630, a video motion detection module 640, a media format conversion module 650, a content-based processing module 660, and an A/V content recognition module 670. Each of these embedded functionality modules are described in further detail below.

Although the media processing system 125 is configured to perform at least some of the processing of the media data on the printer 100, the system 125 may be coupled to an external computing device 680, which can share some of the computing burden. The shared computing device 680 may be a computer system or a dedicated media processing hardware device. In this way, the printer 100 relieves the source of the time-based media from at least some of the processing burden required to implement the printer's functionality, but the printer 100 need not shoulder the entire burden. The printer 100 can thus avoid slow-downs that can result from a heavy processing load, which may be especially important for shared printers.

Printer with Multimedia Functionality

As explained, the printer 100 may include an embedded multimedia server module 610 that enables the printer 100 to act as a multimedia server and have associated functionality. In various embodiments, the multimedia server module 610 includes hardware and software for carrying out multimedia functionality, media processing software, and computer interface hardware and software. In this way, the printer 100 can act like a multimedia server, which could be shared by a work group or used as a personal printer. Various embodiments of a multifunction printer having multimedia functionality are possible applications for a printer in accordance with embodiments of this invention. A number of specific embodiments for such a printer are described in a co-pending U.S. patent application entitled, "Printer with Multimedia Server," filed Mar. 30, 2004, which application is incorporated by reference in its entirety.

Printer with Encryption Functionality

Similarly, the printer 100 may include an embedded encryption module 620, which enables the printer 100 to perform encryption functions on the received media data. In a typical application, the printer 100 receives a media file to be encrypted, encrypts the file, and then writes the encrypted media file onto a removable storage device. The printer 100 also prints an associated paper output that provides information about the encryption, such as the encryption key, a password, an identification of the media, and optionally a description of the content of the media encrypted.

While various embodiments of a multifunction printer having encryption functionality are possible applications for a printer in accordance with embodiments of this invention. A number of specific embodiments for such a printer are described in a co-pending U.S. patent application entitled, "Multimedia Output Device Having Embedded Encryption Functionality," filed Mar. 30, 2004, which application is incorporated by reference in its entirety.

Printer with Audio Localization and/or Video Motion Detection Functionality

In addition, the printer 100 may include an embedded audio localization module 630 and/or an embedded video motion detection module 640, which enable the printer 100 to produce outputs based on the location of sound or the detection of motion in the received media. In this way, the printer can observe events and aid the user in filtering through a massive amount of data about those events.

In one embodiment, the printer 100 includes embedded audio capture and sound source localization hardware. In another embodiment, or in addition, the printer 100 includes video capture and motion detection hardware and software. In this way, the printer 100 can create a printed document and an electronic output that, together, summarize the audio and/or video events that were detected. The events can be defined and their representation in a document can be designed before the events occur. That information can then be communicated to the printer 100 by printing the document before the events happen. The printer can recognize future events in the documents it receives and schedule documents for printing after the events are detected. This may be helpful, for example, to verify the creation of intellectual property or to detect the time when a burglar entered an office. If the documents are printed, the paper can be easily incorporated in an existing paper-based workflow.

In an example embodiment, the media data include video data with a separate multi-channel audio track that was produced from a known configuration of microphones. In this way, the system can be designed to optimize audio source localization. The printer can then create outputs based on the result of sound localization and user input that indicates the directions of interest to the user. For example, clips can be selected from the video when people in those locations were speaking. Key frames and bar codes for those clips can then be printed on the printed output.

Various embodiments of a multifunction printer having audio localization and/or video motion detection functionality are possible applications for a printer in accordance with embodiments of this invention. A number of specific embodiments for such a printer are described in a co-pending U.S. patent application entitled, "Printer With Audio/Video Localization," filed Mar. 30, 2004, which application is incorporated by reference in its entirety.

Printer with Media Format Conversion Functionality

As explained above, the printer 100 may include an embedded media format conversion module 650. The media format conversion module 650 enables the printer 100 to convert the received media data into various formats other than that in which it is received. The media format conversion module 650 may include appropriate hardware and software for carrying out its functionality, such as audio rendering software, processing logic for different types of media conversions, and a speaker output. In this way, the printer 100 may contain an embedded formatter that can decode, encode, and/or convert media data from one format type into another format type.

In one embodiment, the printer 100 converts a digital audio file, such as a MIDI file, into a paper representation as a musical score. Optionally, the printer 100 also converts the input data to another audio format, such as MP3, that could be played on other devices, such as a cell phone. Bar codes can be added to a printed paper representation of the media to let the user play the audio corresponding to lines of music on a remote device or through the speaker on the printer.

Various other embodiments of a multifunction printer having audio format conversion functionality are possible applications for a printer in accordance with embodiments of this invention. A number of specific embodiments for such a printer are described in a co-pending U.S. patent application entitled, "Music Processing Printer," filed Mar. 30, 2004, which application is incorporated by reference in its entirety.

Printer with Content-Based Processing Functionality

As explained, the printer 100 may include an embedded content-based processing module 660, which enables the printer 100 to receive and process real-time broadcasts of media data responsive to the content of the media. In one embodiment, the printer 100 includes an embedded receiver, such as a television, satellite, or cable, radio, or other type of media receiver. The printer 100 may further include processing logic that can monitor a live media feed, recording media, generate a printed representation of the media, and play the audio or video on the printer's console. The printer 100 thus enables the live monitoring of the content of radio or television broadcasts and the generation of paper and storage of multimedia in response to events detected in those streams.

Examples of events include tone sequences indicative of National Weather Service or Emergency Alert Service alerts, but they could also include user-defined events such as the appearance of a specified set of key words in the closed caption of a television broadcast, the appearance of a given image in a video stream (e.g., a face image), or the occurrence of gun shots in an audio stream. The instant generation of the paper when events occur allows the user to pick up a print-out off the printer at any later time without needing to press any other buttons or performing other manual operations.

Various embodiments of a multifunction printer having content-based processing functionality are possible applications for a printer in accordance with embodiments of this invention. A number of specific embodiments for such a printer are described in a co-pending U.S. patent application entitled, "Printer With Audio or Video Receiver, Recorder, and Real-Time Content-Based Processing Logic," filed Mar. 30, 2004, which application is incorporated by reference in its entirety.

Printer with Audio/Video Content Recognition and Processing Functionality

As explained, the printer 100 may include an embedded A/V content recognition module 670, which enables the printer 100 to recognize particular properties in the content of the media data and process the data based on that recognized content. In one embodiment, the printer 100 receives the media data from an electronic file, which the printer 100 uses to convert the time-based media into related printed and electronic outputs. In one embodiment, the printer 100 includes audio and/or video content recognition and processing software and/or hardware. The types of embedded hardware and software required depend on the desired content recognition functionality, and examples of the types of functionalities the embedded A/V content recognition module 370 may perform include video event detection, video foreground/background segmentation, face detection, face image matching, face recognition, face cataloging, video text localization, video optical character recognition (OCR), language translation, frame classification, clip classification, image stitching, audio reformatting, speech recognition, audio event detection, audio waveform matching, caption alignment, audio-caption alignment, and any other type of media content recognition algorithms. The printer 100 further includes processing logic that interacts with the user through the user interface 110 to generate the desired printed and electronic outputs.

Various embodiments of a multifunction printer having audio/video content recognition and processing functionality are possible applications for a printer in accordance with embodiments of this invention. A number of specific embodiments for such a printer are described in a co-pending U.S. patent application entitled, "Printing System With Embedded Audio/Video Content Recognition and Processing," filed Mar. 30, 2004, which application is incorporated by reference in its entirety.

General Comments

While examples of suitable printing systems are described above, the description of the printer and its document production means is not meant to be limiting. Depending on the intended application, a printer can take many different forms other than the typical office or home-use printer with which most people are familiar. Therefore, it should be understood that the definition of a printer includes any device that is capable of producing an image, words, or any other markings on a surface. Although printing on paper is discussed above, it should be understood that a printer in accordance with various embodiments of the present invention could produce an image, words, or other markings onto a variety of tangible media, such as transparency sheets for overhead projectors, film, slides, canvass, glass, stickers, or any other medium that accepts such markings.

In addition, the description and use of media and media data are not meant to be limiting, as media include any information, tangible or intangible, used to represent any kind of media or multimedia content, such as all or part of an audio and/or video file, a data stream having media content, or a transmission of media content. Media may include one or a combination of audio (including music, radio broadcasts, recordings, advertisements, etc.), video (including movies, video clips, television broadcasts, advertisements, etc.), software (including video games, multimedia programs, graphics software, etc.), and pictures; however, this listing is not exhaustive. Furthermore, media and media data may further include anything that itself comprises media or media data, in whole or in part, and media data includes data that describes a real-world event. Media data can be encoded using any encoding technology, such as MPEG in the case of video and MP3 in the case of audio. They may also be encrypted to protect their content using an encryption algorithm, such as DES, triple DES, or any other suitable encryption technique.

Moreover, any of the steps, operations, or processes described herein can be performed or implemented with one or more software modules or hardware modules, alone or in combination with other devices. It should further be understood that portions of the printer described in terms of hardware elements may be implemented with software, and that software elements may be implemented with hardware, such as hard-coded into a dedicated circuit. In one embodiment, a software module is implemented with a computer program product comprising a computer-readable medium containing computer program code, which can be executed by a computer processor for performing the steps, operations, or processes described herein.

In alternative embodiments, the printer can use multiple application servers, acting in cooperation. Any of the requests or messages sent or received by the printer can be sent across a network, using local cables such as IEEE1394, Universal Serial Bus, using wireless networks such as IEEE 802.11 or IEEE 802.15 networks, or in any combination of the above.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings. It is therefore intended that the scope of the invention be limited not by this detailed description, but rather by the claims appended hereto.

We claim:

1. A printer for printing time-based media, the printer comprising:

an interface for receiving time-based media from an external source;

a media processing system coupled to the interface to receive the time-based media, the media processing system creating a printed representation of the time-based media and determining an electronic representation of the time-based media, wherein the printed representation includes a representation of the time-based media at a plurality of times thereof and a plurality of bar codes that associate time locations within the electronic representation with the plurality of times represented in the printed representation;

a printed output system in communication with the media processing system to receive the printed representation, the printed output system producing a corresponding printed output from the printed representation of the time-based media; and a electronic output system in communication with the media processing system to receive the electronic representation, the electronic output system producing a corresponding electronic output from the electronic representation of the time-based media.

2. The printer of claim 1, wherein the interface comprises a single communication interface allowing the printer to be communicatively coupled to an electronic device, the electronic device providing the time-based media to the printer.

3. The printer of claim 1, wherein the interface comprises a removable media storage reader.

4. The printer of claim 1, wherein the interface comprises a video input device selected from a group consisting of: a DVD reader, a video cassette tape reader, and a flash card reader.

5. The printer of claim 1, wherein the interface comprises an audio input device selected from a group consisting of: a CD reader, an audio cassette tape reader, and a flash card reader.

6. The printer of claim 1, wherein the external source is a media broadcaster, and wherein the interface comprises a media broadcast receiver that can be tuned to a media broadcast.

7. The printer of claim 1, wherein the interface comprises an embedded receiver selected from a group consisting of: an embedded TV receiver, an embedded radio receiver, an embedded short-wave radio receiver, an embedded satellite radio receiver, an embedded two-way radio, and an embedded cellular phone.

8. The printer of claim 1, wherein the interface comprises an embedded device selected from a group consisting of: an embedded heat sensor, an embedded humidity sensor, an embedded National Weather Service radio alert receiver, and an embedded TV Emergency Broadcast System (EBS) alert monitor.

9. The printer of claim 1, wherein the interface comprises embedded screen capture hardware.

10. The printer of claim 1, wherein the interface comprises an ultrasonic pen capture device.

11. The printer of claim 1, wherein the interface comprises an embedded video recorder, wherein the external source of media is a series of images captured by embedded the video recorder, converted into an electrical format, and then provided to the media processing system.

12. The printer of claim 1, wherein the interface comprises an embedded audio recorder, wherein the external source of media is a series of sounds that are converted into an electrical format by the embedded audio recorder and then provided to the media processing system.

13. The printer of claim 1, wherein the electronic output system is configured to write the electronic representation to a removable media storage device.

14. The printer of claim 13, wherein the removable storage device is selected from a group consisting of: a DYD, a video cassette tape, a CD, an audio cassette tape, a flash card, a computer disk, an SD disk, and a computer-readable medium.

15. The printer of claim 1, wherein the electronic output system comprises a handling mechanism to accommodate a plurality of removable storage devices.

16. The printer of claim 15, wherein the handling mechanism is selected from a group consisting of: a feeder, a bandolier, and a tray.

17. The printer of claim 1, wherein the electronic output system comprises a disposable media writer.

18. The printer of claim 1, wherein the electronic output system comprises a self-destructing media writer.

19. The printer of claim 1, wherein the electronic output system is coupled to a speaker system and sends an audio signal to the speaker system.

20. The printer of claim 19, wherein the electronic output system comprises an embedded sound player for generating the audio signal.

21. The printer of claim 1, wherein the electronic output system comprises an embedded web page display.

22. The printer of claim 1, wherein the media processing system comprises an embedded multimedia server.

23. The printer of claim 1, wherein the media processing system comprises an embedded audio encryption module.

24. The printer of claim 1, wherein the media processing system comprises an embedded video encryption module.

25. The printer of claim 1, wherein the media processing system comprises an embedded audio sound localization module.

26. The printer of claim 1, wherein the media processing system comprises an embedded video motion detection module.

27. The printer of claim 1, further comprising:

a user interface coupled to the media processing system, the user interface providing information to a user about at least one of the printed representation and the electronic representation of the time-based media, the user interface further accepting input from a user to cause the media processing system to modify at least one of the printed representation and the electronic representation of the time-based media.

28. The printer of claim 27, wherein the user interface communicates with a user through a computer system coupled to the printer.

29. The printer of claim 1, wherein the media processing system determines at least one of the printed representation and the electronic representation with assistance from an external computing device.

30. A multifunction printer comprising:

an input source for receiving time-based media;

a first output source coupled to the input source, the first output source producing a printed representation of the time-based media;

a second output source coupled to the input source, the second output source producing an electronic representation of the time-based media, the electronic representation of the time-based media corresponding to the printed representation of the time-based media, wherein the printed representation includes a representation of the time-based media at a plurality of times thereof and a plurality of bar codes that associate time locations within the electronic representation with the plurality of times represented in the printed representation.

31. The printer of claim 30, wherein the input source comprises a single communication interface allowing the printer to be communicatively coupled to an electronic device, the electronic device providing the media to the printer.

32. The printer of claim 30, wherein the input source comprises a removable media storage reader.

33. The printer of claim 30, wherein the input source comprises a video input device selected from a group consisting of: a DVD reader, a video cassette tape reader, and a flash card reader.

34. The printer of claim 30, wherein the input source comprises an audio input device selected from a group consisting of: a CD reader, an audio cassette tape reader, and a flash card reader.

35. The printer of claim 30, wherein the input source comprises a media broadcast receiver that can be tuned to a media broadcast.

36. The printer of claim 30, wherein the input source comprises an embedded receiver selected from a group consisting of: an embedded TV receiver, an embedded radio receiver, an embedded short-wave radio receiver, an embedded satellite radio receiver, an embedded two-way radio, and an embedded cellular phone.

37. The printer of claim 30, wherein the input source comprises an embedded device selected from a group consisting of: an embedded heat sensor, an embedded humidity sensor, an embedded National Weather Service radio alert receiver, and an embedded TV Emergency Broadcast System (EBS) alert monitor.

38. The printer of claim 30, wherein the input source comprises embedded screen capture hardware.

39. The printer of claim 30, wherein the input source comprises an ultrasonic pen capture device.

40. The printer of claim 30, wherein the input source comprises an embedded video recorder, wherein the external source of media is a series of images captured by embedded the video recorder, converted into an electrical format, and then provided to the media processing system.

41. The printer of claim 30, wherein the input source comprises an embedded audio recorder, wherein the external source of media is a series of sounds that are converted into an electrical format by the embedded audio recorder and then provided to the media processing system.

42. The printer of claim 30, wherein the second output source is configured to write the electronic representation to a removable media storage device.

43. The printer of claim 42, wherein the removable storage device is selected from a group consisting of: a DVD, a video cassette tape, a CD, an audio cassette tape, a flash card, a computer disk, an SD disk, and a computer-readable medium.

44. The printer of claim 30, wherein the second output source comprises a handling mechanism to accommodate a plurality of removable storage devices.

45. The printer of claim 44, wherein the handling mechanism is selected from a group consisting of: a feeder, a bandolier, and a tray.

46. The printer of claim 30, wherein the second output source comprises a disposable media writer.

47. The printer of claim 30, wherein the second output source comprises a self-destructing media writer.

48. The printer of claim 30, wherein the second output source is coupled to a speaker system and sends an audio signal to the speaker system.

49. The printer of claim 48, wherein the second output source comprises an embedded sound player for generating the audio signal.

50. The printer of claim 30, wherein the second output source comprises an embedded web page display.

51. A method for printing time-based media, the method comprising:

receiving time-based media from an external source;

processing the time-based media at least in part within a printing system to create a printed representation of the time-based media and determine an electronic representation of the time-based media, wherein the printed representation includes a representation of the time-based media at a plurality of times thereof and a plurality of bar codes that associate time locations within the electronic representation with the plurality of times represented in the printed representation;

producing a printed output that corresponds to the printed representation of the time-based media; and producing an electronic output that corresponds to the electronic representation of the time-based media.

52. The method of claim 51, wherein the time-based media are received via a single communication interface.

53. The method of claim 51, wherein the time-based media are received from a removable media storage reader of the printing system.

54. The method of claim 51, wherein the time-based media are received from a video input device of the printing system selected from a group consisting of: a DVD reader, a video cassette tape reader, and a flash card reader.

55. The method of claim 51, wherein the time-based media are received from an audio input device of the printing system selected from a group consisting of: a CD reader, an audio cassette tape reader, and a flash card reader.

56. The method of claim 51, wherein the time-based media are received from a media broadcast receiver of the printing system, the media broadcast receiver tunable to a media broadcast.

57. The method of claim 51, wherein the time-based media are received from an embedded receiver selected from a group consisting of: an embedded TV receiver, an embedded radio receiver, an embedded short-wave radio receiver, an embedded satellite radio receiver, an embedded two-way radio, and an embedded cellular phone.

58. The method of claim 51, wherein the time-based media are received from an embedded device selected from a group consisting of: an embedded heat sensor, an embedded humidity sensor, an embedded National Weather Service radio alert receiver, and an embedded TV Emergency Broadcast System (EBS) alert monitor.

59. The method of claim 51, wherein the time-based media are received from embedded screen capture hardware.

60. The method of claim 51, wherein the time-based media are received from an ultrasonic pen capture device.

61. The method of claim 51, wherein the time-based media are received from an embedded video recorder, wherein the external source is a series of images captured by embedded the video recorder, converted into an electrical format, and then provided to the media processing system.

62. The method of claim 51, wherein the time-based media are received from an embedded audio recorder, wherein the external source is a series of sounds that are converted into an electrical format by the embedded audio recorder and then provided to the media processing system.

63. The method of claim 51, wherein producing the electronic output comprises writing the electronic representation to a removable media storage device.

64. The method of claim 63, wherein the removable storage device is selected from a group consisting of: a DVD, a video cassette tape, a CD, an audio cassette tape, a flash card, a computer disk, an SD disk, and a computer-readable medium.

65. The method of claim 51, wherein a disposable media writer produces the electronic output.

66. The method of claim 51, wherein a self-destructing media writer produces the electronic output.

67. The method of claim 51, wherein producing the electronic output comprises generating an audio signal for playback by a speaker system.

68. The method of claim 51, wherein producing the electronic output comprises generating a video signal for playback by a display system.

* * * * *